Figure 1:
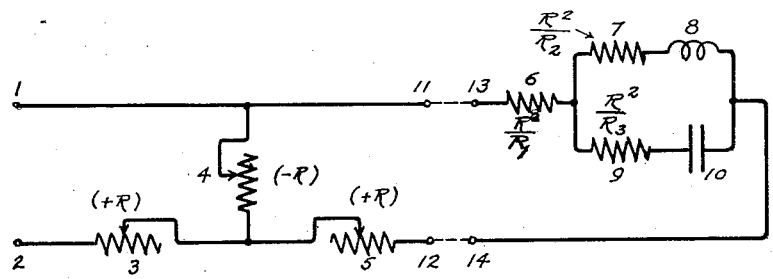

Aug. 14, 1934.  M. M. DOLMAGE  1,969,836
NEGATIVE IMPEDANCE
Filed Oct. 27, 1932

INVENTOR.

Patented Aug. 14, 1934

1,969,836

UNITED STATES PATENT OFFICE 1,969,836

NEGATIVE IMPEDANCE

Mihran M. Dolmage, Washington, D. C.

Application October 27, 1932, Serial No. 639,919

6 Claims. (Cl. 178—44)

This invention relates to a new combination in the electrical art, a negative impedance.

The term impedance, in the present invention, is taken in its broadest general sense. It may include resistance, capacity, and inductance elements. These may be associated in any complex electrical network we may choose. We may also have a multiplicity of resistance, capacity and inductance elements, in periodically recurring structures. The inductance, capacity and resistance elements may be in series or in shunt combination. The various impedance elements may also be those in a natural transmission line, with uniformly distributed constants. The term "negative impedance", as herein used, is also taken in its broadest general meaning—in that if the complex "impedance" as just defined is included in an electrical circuit, the present invention shows a method whereby its exact "negative" image may be designed, so that if this "negative" impedance and the originally given impedance are included in a circuit in series relation, for instance, the combined impedance will be zero ohms, and what is more important, this neutralization will hold simultaneously for all frequencies, from a few cycles to a million cycles or more. There is no novelty or difficulty involved in the present art, given any electrical circuit, to finding a second circuit which when wired in series with the first circuit will completely neutralize the impedance of the first. But such complete neutralization can only be effected for some one given frequency. Where it is necessary to transmit simultaneously a number of frequencies over a given line, or through a given electrical circuit (which is the general case in signaling circuits, both of the wire and wireless types), then none of the ordinary methods of neutralization can be applied, as the neutralization with such ordinary methods can be completely effected, as above stated, for one frequency only. The neutralization for all other frequencies, is partial, as well known, and when this is the case, the resulting effect as regards all these other frequencies, is designated under the general term of "distortion". The elimination of such "distortion" is extremely important, particularly in the long cables used in the communication art.

In a number of prior applications, I have disclosed for the first time, certain simple types of "negative" impedances. In U. S. A. 1,606,350, Nov. 9, 1926, granted to me, is shown a "negative" resistance; in U. S. A. 1,815,838, July 21, 1931, also granted to me, is shown a "negative" capacity; in U. S. A. 1,903,610, April 11th, 1933, is shown a "negative" inductance. All of these devices are the "negatives" of single electrical elements. In U. S. A. 1,910,151, May 23, 1933, I have shown it "negative" anti-resonant circuit, which contains just two elements, an inductance and a capacity. The present invention is one of more general scope, in that it includes resistance elements, in addition to a multiplicity of reactance elements, and all these elements may be included in any complex circuit imaginable and in any conceivable multiplicity.

It should be understood, of course, that instead of complete neutralization of the impedance of a circuit, we may arrange for partial neutralization, if we so wish. If, for instance, we wish fifty per cent neutralization of the impedance elements included in a circuit, we can accomplish this result also, such neutralization being equally effective at all frequencies.

The novel features of my invention are pointed out in the appended claims. The invention itself will be best understood by reference to the drawing and discussion given hereunder.

Figure 2:
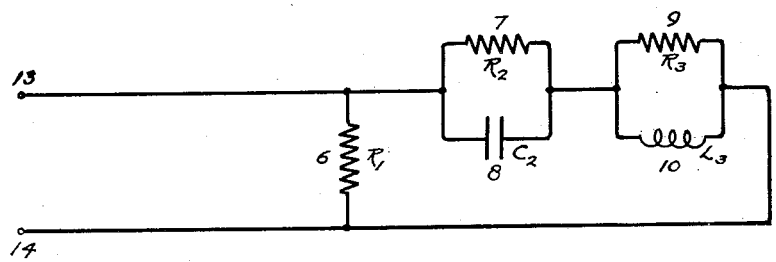
Figure 3:
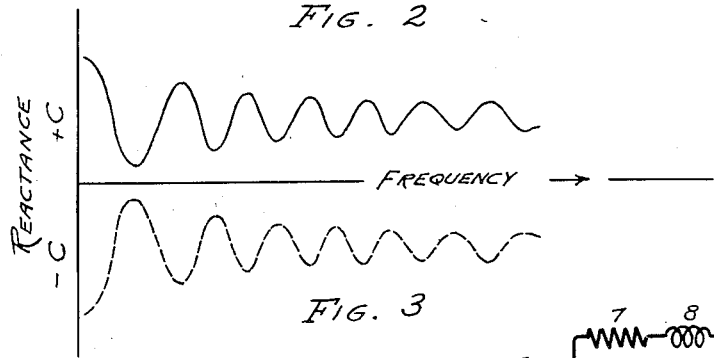
Figure 4:
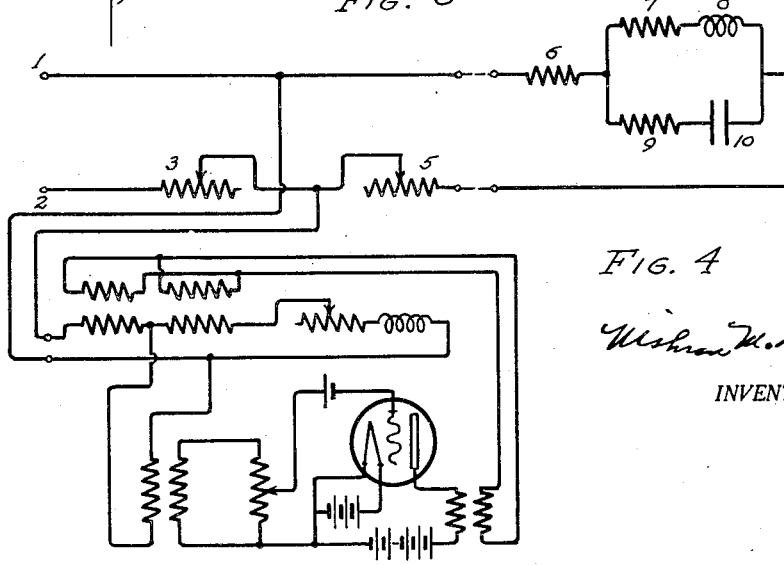

Fig. 1 of the drawing shows the general idea underlying the use of my method. Fig. 2 shows the impedance ($Z_2$), with all its components, whose negative image or counterpart ($-Z_2$) is reproduced by the arrangement shown on Fig. 1 of the drawing. Fig. 3 shows in graphic form the characteristics of the negative impedance device designed to simulate the "negative" of a telephone line. As a matter of interest, the characteristics of said telephone line, with reference to frequency, are also shown in this same figure in dotted line. It will be seen how, for each frequency, the combined impedance of the various elements included as part of the "negative" impedance, is the exact negative image or counterpart of the impedance of a telephone line. Fig. 4 shows a particular method of carrying out my invention, using as a negative resistance the particular type of circuit and apparatus covered in U. S. A. Patent No. 1,606,350, granted to me.

The apparatus, where it is shown on Fig. 1 of the drawing, represents, when viewed from terminals (1, 2), a "negative impedance" within the meaning already specified. Element (3) is an ordinary resistance. Element (4) is a "negative" resistance. It may be of any type known to the art. It may be, for instance, of the type first disclosed by Dr. Hull (U. S. A. Patent 1,313,187), or preferably, it may be of the type first disclosed by me (U. S. A. Patent 1,606,350) and reproduced in Fig. 2 of the drawing, wired across the terminals (7, 8). The character of the elements (6), (7), (8), (9) and (10), which form part of a complex impedance have been shown in accordance with the usual conventions. The impedances involved in this case are thus five in number. It is proposed to construct an electrical system which will have the impedance $(-Z_2)$, the exact "negative" for the impedance $(+Z_2)$ for any frequency between a few cycles to a million cycles, or more. The impedance $(+Z_2)$ we are referring to here, is the impedance of the entire combination of the five different elements $-R_1$, $R_2$, $R_3$, $L_3$ and $C_2$ as seen or measured from terminals (13, 14) of Fig. 2 of the drawing. The invention shows a method whereby an impedance $(-Z_2)$ may be constructed.

Since the expression for the impedance $(+Z_1)$ connected to terminals (13, 14) of Fig. 1 of the drawing, as a function of frequency is quite complex, we will not develop it, in order to avoid unnecessary complications in exposition of the subject. We will simply assume that $(+Z_1)$, the general expression for this impedance, varies in some complex fashion to frequency, that for some one frequency it has a resistance component and a reactance component, such reactance component being inductive or capacitive, as the case may be, depending upon the particular value of the frequency considered. If we write the expression for the impedance for the circuit shown on Fig. 1 of the drawing, as measured from terminals (1, 2), we find it is equal to (1) $$R + \frac{-R(R+Z_1)}{-R+(R+Z_1)} = -\frac{R^2}{Z_1}$$

where $Z_1$ is the impedance of the combination shown connected to terminals (13, 14) of Fig. 1 of the drawing. We so choose the constitutive elements of the impedance $(+Z_1)$ of Fig. 1 of the drawing with respect to the constitutive elements of the impedance $(+Z_2)$ of Fig. 2 of the drawing, that the following relation is satisfied for the two corresponding or "inverse" impedances $(+Z_1)$ and $(+Z_2)$.

(2) $$\frac{R^2}{Z_1} = Z_2.$$

In order to illustrate the method used in constructing the combination of impedances $(+Z_1)$ knowing the constitutive elements of the impedance $(+Z_2)$, the corresponding elements in the two impedance combinations have been given the same numerical designations on Fig. 1 and Fig. 2 of the drawing. Element 6 of the impedance combination of Fig. 2 of the drawing is in shunt across terminals (13, 14); the corresponding element 6 of Fig. 1 of the drawing is wired in series, across terminals (13, 14), of Fig. 1 of the drawing, as shown. The parallel elements (7) (8), of Fig. 2 of the drawing, correspond with two series elements (7) (8) of Fig. 1 of the drawing, the resistance element being "matched" by another resistance element, but the capacity element being "matched" by an inductance element. The parallel elements (9) (10) of Fig. 2 of the drawing, (a resistance in parallel to the inductance), are "matched" on Fig. 1 of the drawing, by elements (9) and (10), consisting of the series combination of a resistance and a condenser. Thus, for each element in the impedance $(+Z_2)$, a corresponding constitutive element was chosen to form part of the impedance combination, $(Z_1)$ of Fig. 1 of the drawing, in the manner described and as illustrated on the drawing. In general, the networks comprising these two impedances $(+Z_1)$ and $(+Z_2)$, will be designated as "inverse networks". If the constitutive elements of the two networks of Fig. 1 and Fig. 2 of the drawing had been chosen as just described, then the general equation (2), relating together the impedances $(+Z_1)$ and $(+Z_2)$ would hold, provided further, certain numerical relationships are established as indicated in detail hereunder. Another way of expressing this general equation, which as will be seen hereunder, holds true equally for all frequencies, would be—

(3) $$Z_1 Z_2 = R^2$$

In order to indicate the practicability of building two "inverse networks" of the general type indicated, we proceed to choose the impedances $Z_4$, $Z_5$, and $Z_6$, of Fig. 1 of the drawing, to correspond to the originally given admittances of Fig. 2 of the drawing, as follows:

(4) $$\frac{Z_4}{Y_4} = R^2$$

(5) $$\frac{Z_5}{Y_5} = R^2$$

(6) $$\frac{Z_6}{Y_6} = R^2$$

wherein
$Y_4$=admittance of element 6 of Fig. 2 of the drawing;
$Z_4$=impedance of the corresponding element 6 of Fig. 1 of the drawing.
$Y_5$=admittance of elements (7) and (8) of Fig. 2 of the drawing;
$Z_5$=impedance of the corresponding elements (7) and (8) of Fig. 1 of the drawing.
$Y_6$=admittance of elements (9) and (10) of Fig. 2 of the drawing.
$Z_6$=impedance of the corresponding elements of (9) and (10) of Fig. 1 of the drawing.

The expression for the total admittance $(Y_2)$ of the combination of impedances connected to terminals (13, 14) of Fig. 2 of the drawing is—

(7) $$Y_2 = Y_4 + \frac{Y_5 Y_6}{Y_5 + Y_6}$$

The expression for the total impedance $(+Z_1)$ of the corresponding elements of Fig. 1 of the drawing is given by—

(8) $$Z_1 = Z_4 + \frac{Z_5 Z_6}{Z_5 + Z_6}$$

Replacing in the equation (8), the values of $(Z_4)$, $(Z_5)$ and $(Z_6)$ in function of the primary admittances, $(Y_4)$, $(Y_5)$ and $(Y_6)$ as given by the above equations (4) (5) and (6), respectively, we obtain—

(9) $$Z_1 = R^2 \left( Y_4 + \frac{Y_5 Y_6}{Y_5 + Y_6} \right)$$

hence, the product of the impedances $(+Z_1)$ and $(+Z_2)$ is equal to—

(10) $$Z_1 Z_2 = \frac{Z_1}{Y_2} = R^2 \times \frac{Y_4 + \frac{Y_5 Y_6}{Y_5 + Y_6}}{Y_4 + \frac{Y_5 Y_6}{Y_5 + Y_6}} = R^2$$

The above relation is absolutely independent of frequency, provided, of course, we can effectively satisfy equations (4), (5) and (6) without discrimination as to frequency. Considering first the two corresponding elements (6), each of which is a resistance, there can of course be no difficulty as to frequency discrimination here and equation (4) can be satisfied exactly. Considering, next, the admittance of elements (7) and (8) of Fig. 2 of the drawing, evidently—

(11) $$Y_5 = \frac{1}{R_2} + jpC_2$$

Suppose we choose the corresponding elements (7) and (8) in Fig. 1 of the drawing, as follows—

$$\text{Resistance} = \frac{R^2}{R_2}$$

$$\text{Inductance} = C_2 R^2$$

The impedance $Z_5$ is thus equal to $$\frac{R^2}{R_2} + jpL_2 = R^2\left(\frac{1}{R_2} + jpC_2\right)$$

Hence the ratio—

(12) $$\frac{Z_5}{Y_5} = R^2$$

is absolutely independent of frequency.

Considering, next, the admittance of elements (9) and (10), Fig. 2 of the drawing—

(13) $$Y_6 = \frac{1}{R_3} - j\frac{1}{pL_3}$$

Suppose we choose the corresponding elements in Fig. 1 of the drawing, as follows—

$$\text{Resistance} = R^2 \frac{1}{R_3}$$

$$\text{Capacity} = \frac{L_3}{R^2}$$

The impedance $Z_6$ is given by—

(14) $$Z_6 = \frac{R^2}{R_3} - j\frac{1}{pC_3}$$

The ratio $$\frac{Z_6}{Y_6},$$

as obtained by dividing equation (14) by equation (13), is equal, then, to—

(15) $$\frac{Z_6}{Y_6} = R^2$$

and is absolutely independent of frequency.

We thus have been able to construct an impedance $(+Z_1)$, which is equal to $$\frac{R^2}{Z_2},$$

as shown in equation (2), for all values of frequency. It follows, therefore, that for all values of frequency, the impedance of a combination of elements wired to terminals (1), (2) of Fig. 1 of the drawing, is equal to—

(16) $$\frac{-R^2}{Z_1} = -Z_2$$

Therefore, in order to obtain a negative impedance $(-Z_2)$ this impedance $(Z_2)$ being constructed as shown in detail on Fig. 2 of the drawing, comprising elements (6), (7), (8), (9) and (10), we construct an inverse network of constant resistance product, having the impedance $(+Z_1)$, defined as follows:

$$Z_1 = \frac{R^2}{Z_2}$$

We then connect this inverse network $Z_1$ into a circuit such as is shown in Fig. 1 of the drawing, in conjunction with a system of two positive and one negative resistances, all these resistances having substantially the same numerical value.

The method above described is absolutely general, and is applicable regardless of the number or complications of the elements involved in the impedance combination $(Z_2)$, whose negative image or counterpart must be obtained. It is applicable to an impedance or network system containing any number of elements, instead of just five elements, as assumed on Fig. 3 of the drawing. It can also be applied to extended circuits with distributed constants, such as a high tension line or a transmission line, used in the signalling art. In all cases the inverse network $(+Z_1)$ must be constructed with as many elements as there are included in the impedance $(+Z_2)$ as originally given. Since most reactances, in practice, also have resistance components unavoidably, the negative impedances which can be built, using the method first disclosed in these specifications, can be made to match perfectly any type of electrical circuit; even those with distributed constants can be so matched, provided the number of discreet impedance elements representing such circuit with distributed constants is adequately chosen, in accordance with indications of the present art.

It will be noted that the numerical value of $(R)$, in all the equations, is indeterminate. It is, therefore, possible to so choose $(R)$ that the most convenient or practical value will result for the various impedance elements that must be provided.

An extremely interesting application is shown on Fig. 3 of the drawing. On that figure is shown, in full line, the reactance—frequency characteristics of the negative counterpart of a natural telephone line, and, in dotted line, the actual reactance—frequency characteristics of the natural line itself.

It was not possible, up to the present time, to construct the negative image of a reactance having also a resistance component. The negative capacity device first disclosed by me in U. S. A. 1,815,838 and the negative inductance device, first disclosed by me in U. S. A. 1,903,610, April 11, 1933, could only be used to match a positive capacity and a positive inductance, respectively, in an approximate manner only, in view of the fact that all capacities and inductances that are commercially available, possess resistance components. With the method, as first disclosed in these specifications, it is possible to obtain a more perfect neutralization of the inductances and the capacities that are met with in practice. Furthermore, the present invention is the first showing how negative images of complex impedances, with a multiplicity of parts, may be obtained.

The invention, as first disclosed in the present specifications, thus opens unlimited possibilities in the way of the application of methods of eliminating "distortion" in long telephone cables, in radio antennae, radio broadcasting equipment and radio broadcasting receivers. In all of the cases just mentioned, the primary problem is the difficulty of avoiding unequal impedance response of the respective circuits involved to currents of different frequency. Even where band filters are used, the response to frequencies involved within the band itself, is almost invariably unequal, resulting in "distortion", or lack of "fidelity". All such difficulties can be immediately overcome with the use of the method outlined hereunder. There seems to be an unlimited field of usefulness for the negative impedance device as hereinabove outlined.

Although the analytical treatment has been carried out to show how the exact negative counterpart $(-Z_2)$, of a complex network having an impedance $(+Z_2)$ can be obtained, it is apparent that the procedure hereinabove disclosed may be utilized also for obtaining any desired degree of neutralization. For instance, if a negative impedance $(-Z_2)$ is wired in series with a given complex impedance $(+Z_2)$ the total circuit impedance will be zero, and it will be zero for all frequencies. However, nothing prevents us from obtaining, say, 50% neutralization of the impedance $(+Z_2)$, said neutralization being equally effective at all frequencies, since we can also construct a negative impedance $(-\frac{1}{2}Z_2)$ which, when inserted in series with the given network, will result in an impedance $(+\frac{1}{2}Z_2)$, one-half of the original impedance.

It is also evident that negative impedance networks, constructed in accordance with the method first disclosed in these specifications, when inserted at equal or unequal intervals in a natural transmission line, will compensate completely for both attenuation and phase distortion. In Fig. 3 of the drawing, the extremely valuable negative reactance-frequency properties of a network built in accordance with the present invention have been shown. These properties are the exact opposite of those of a natural transmission line as definitely indicated on Fig. 3 of the drawing in dotted line. It should be understood, of course, that similar negative properties for the resistance component are simultaneously developed, though not illustrated on the drawing for purposes of simplification. It is the development of these negative resistance properties, that is effective in compensating for attenuation distortion, while development of the negative reactance properties, compensates for phase distortion.

I claim:

1. An automatic device of impedance $(-Z_2)$ having resistance and reactance characteristics exactly opposite and equal in absolute value to that of a given complex impedance network $(+Z_2)$ comprising a multiplicity of resistance, capacity and inductance elements, said negative equality relation holding true independently of frequency, said automatic device consisting of the combination of a T network of three resistances substantially equal in absolute value, one of which is a negative resistance, with an inverse network $(Z_1)$ of constant resistance product $(R^2)$ so that $(Z_1Z_2)=(R^2)$ for all values of frequency.

2. A two-terminal electrical network of negative impedance $(-Z_2)$, consisting in the combination of a negative resistance $(-R)$, in parallel with the combination of a positive resistance $(+R)$ in series with the impedance $(+Z_1)$ of a complex network comprising resistance, capacity and inductance elements, the entire combination being wired in series with a positive resistance $(+R)$, said complex impedance $(+Z_1)$ representing an inverse network of constant resistance product $R^2$ to the impedance $(+Z_2)$ of the given network, substantially as described.

3. A two-terminal electrical network of negative impedance $(-Z_2)$, consisting in the combination of a negative resistance $(-R)$ in parallel with the combination of a positive resistance $(+R)$ in series with the impedance $(+Z_1)$ of an inverse network comprising resistance, capacity and inductance elements, the entire combination being wired in series with a positive resistance $(+R)$, each element in network $(+Z_1)$ being matched by a corresponding element in network $(+Z_2)$, so that $Z_1Z_2=R^2$, a series capacity element being matched by a parallel inductance element, a series inductance element by parallel capacity element, a series resistance element by a parallel resistance element, substantially as described.

4. In series combination with a complex electrical network $(Z_2)$ comprising resistance, capacity and inductance elements, automatic means for completely neutralizing both the resistance and the reactance effects of said electrical network to the flow of electrical currents through said network, said means consisting of the structure described in claim 3, equally effective at all frequencies.

5. In an electrical circuit, the parallel combination of a complex electrical network $(+Z_2)$ and of a neutralizing impedance network $(-Z_2)$, the network $(+Z_2)$ comprising resistance, inductance and capacity elements, the neutralizing impedance consisting of automatic means for completely eliminating the effect of the presence of the network $(+Z_2)$ in said electrical circuit, for all values of frequency, said means consisting of the structure described in claim 3.

6. A negative impedance network $(-Z_2)$, consisting of the combination of a T network of three resistances equal in absolute value, one of which is a negative resistance, with an inverse network, $(+Z_1)$ of constant resistance product $R^2$ so that $Z_1Z_2=R^2$, for all values of frequency, said inverse network comprising resistance, inductance and capacity elements.

MIHRAN M. DOLMAGE.